Figure 3:
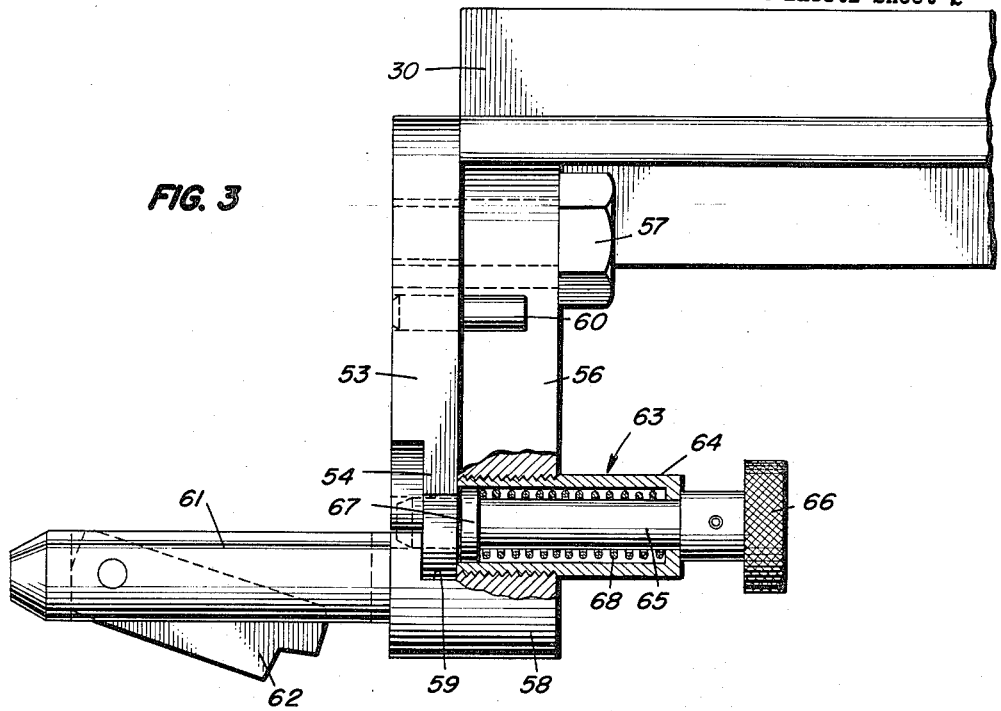

Dec. 20, 1960 E. S. CULVER 2,964,894
MISSILE HANDLING APPARATUS
Filed Aug. 13, 1959 2 Sheets-Sheet 1
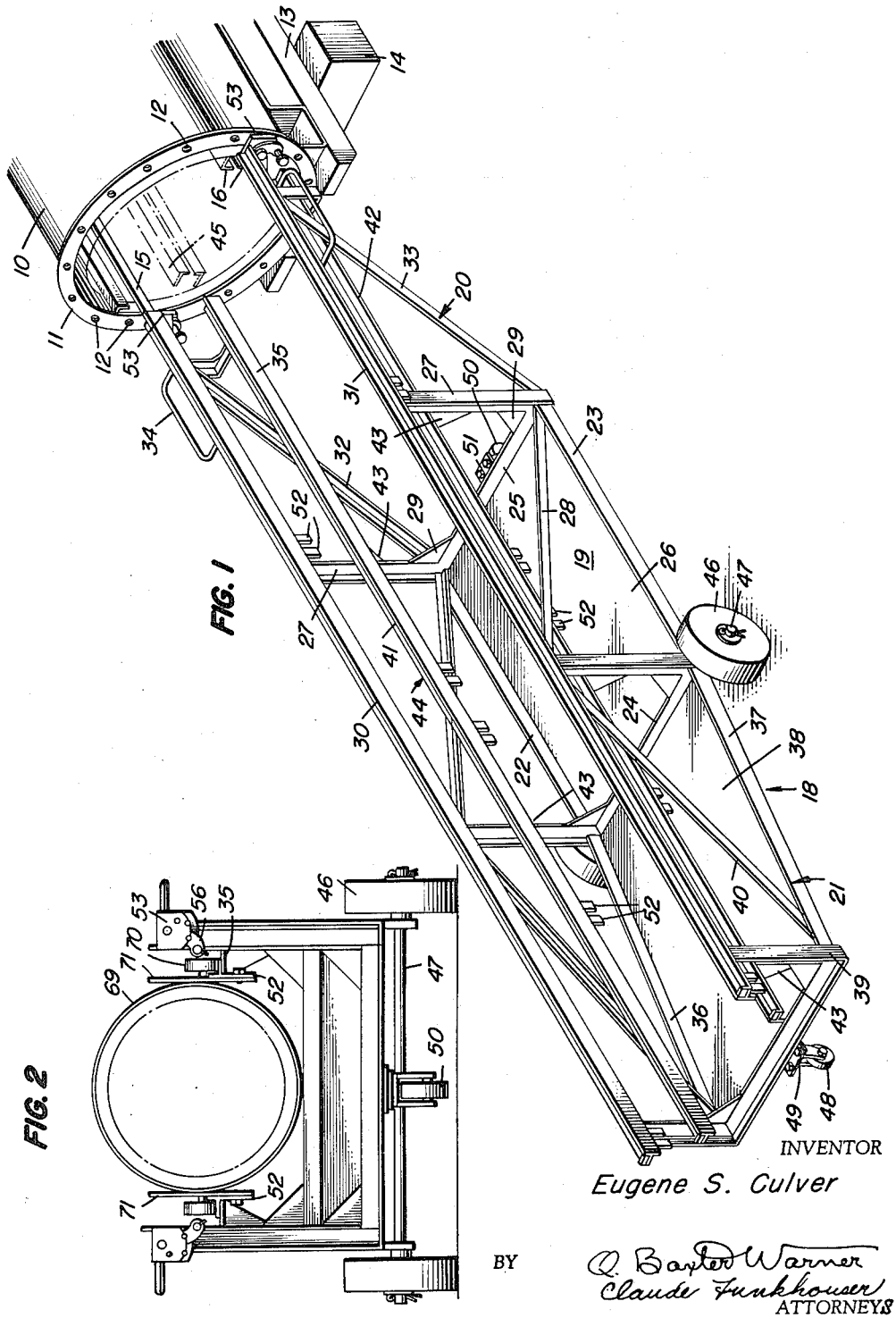
INVENTOR
Eugene S. Culver
BY
Q. Baxter Warner
Claude Funkhouser
ATTORNEYS Dec. 20, 1960 — E. S. CULVER — 2,964,894
MISSILE HANDLING APPARATUS
Filed Aug. 13, 1959 — 2 Sheets-Sheet 2

INVENTOR
Eugene S. Culver

BY
Q. Baxter Warner
Claude Funkhouser
ATTORNEYS

United States Patent Office 2,964,894
Patented Dec. 20, 1960

2,964,894
MISSILE HANDLING APPARATUS

Eugene S. Culver, Arlington, Va., assignor to the United States of America as represented by the Secretary of the Navy Filed Aug. 13, 1959, Ser. No. 833,657

3 Claims. (Cl. 53—257)

The present invention relates generally to missile handling equipment; more particularly it relates to an improved dolly or cart especially useful for removing a missile component from, or storing a missile component in, a shipping container, and for transporting such missile components from place to place in an assembly or other work area.

The major components of certain types of ordnance missiles are shipped in cylindrical steel containers equipped with built-in rails or tracks. The missile components are supported on shock-mount assemblies fitted with rollers which engage the rails of the container, the shock mount assemblies being locked in position in the containers by bolts which are inserted through the outer wall of said container into threaded openings in the shock mount plates. Insertion of these locking bolts is very difficult unless the shock mounts are attached to the missile in precisely the proper positions so that the threaded openings in the shock mount asemblies will align exactly with the bolt holes in the container.

An important object of the present invention, therefore, is to provide a cart which incorporates means for properly orienting the missile component so that when said component is moved into the container, the shock mount plates will be positioned to receive the securing bolts.

Another object of the invention resides in the provision of a cart which is so designed that it may be used for handling either the booster component or the sustainer or "tripak" components of an ordnance missile.

A further object of the invention is to provide a missile component handling cart that may be balanced on its centrally located axle in loaded or unloaded condition, and which may be rolled on a level floor by one man.

And another object of the invention is to provide a cart for the purpose set forth that will be extremely rugged in construction and efficient in operation.

And a still further object of the invention is to provide a missile component handling cart that employs simple and efficient means for attaching it to a shipping container.

Figure 4:
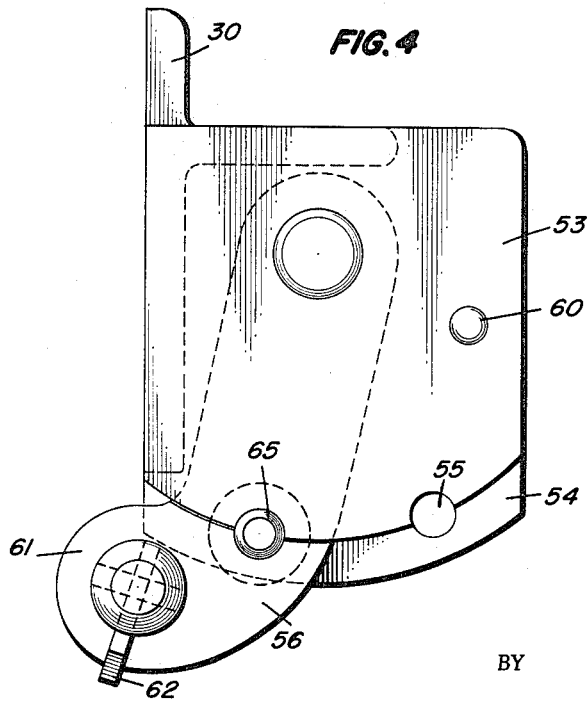

Other objects and many of the attendant advantages of the present invention will be readily appreciated as the same becomes better understood by reference to the following detailed description when considered in connection with the accompanying drawings, wherein:

Fig. 1 is a perspective view illustrating the improved cart as it would appear attached to the open end of a missile component shipping container, Fig. 2 is an end view of the cart, a missile component and one of its attached shock mount assemblies being shown in broken lines, Fig. 3 is an enlarged side elevation, partly in section, showing one of the aligning pins used for attaching the cart to the shipping container, And Fig. 4 is an enlarged end view of the aligning pin structure shown in Fig. 3.

Referring now more particularly to the drawings, the numeral 10 indicates one end portion of a missile component shipping container, said container having a flange 11 formed with a plurality of circumferentially spaced openings 12. The container 10, as shown in Fig. 1, is supported by a suitable mount or skid 13 that rests on chocks, one of which is shown at 14. Rails 15 and 16 extend rearwardly within the container longitudinally thereof, and are arranged diametrically opposite each other. The rails define a track for receiving the rollers of shock mount assemblies, to be described in more detail hereinafter.

The missile component handling cart constituting the present invention includes a frame 18 which is of generally polygonal shape in side elevation. The frame 18 comprises a rectangular center section 19 and forward and aft end sections 20 and 21. The center section 19 has lower side rails 22 and 23 and transversely extending end rails 24 and 25, the end rails being common to the end sections 20 and 21. A drip pan 26 closes the lower end of the center section 19. Corner posts 27 rise from the corners of the center section and these posts are, like the end rails 24 and 25, common to the former and aft sections. Diagonally extending struts 28 and gussets 29 provide bracing for the corner posts.

Top rails 30 and 31 extend throughout the length of the cart and are secured to the upper ends of the posts 27. These top rails define a relatively wide gauge track and align with the track defined by the rails 15 and 16 in the container 10 when the cart is attached to said container, in a manner to be described hereinafter. The top rails are common to all of the sections of the frame and, as best seen in Fig. 1, extend beyond the ends of the forward and aft sections 20 and 21 thereof. The forward section 20 of the frame includes, in addition to forward corner posts 27 and portions of the rails 30 and 31, upwardly inclined rails 32 and 33, hand rails 34, and brackets 35. The aft section 21 includes, in addition to the aftmost corner posts 27 and aft end portions of the rails 30, upwardly inclined side rails 36 and 37, a drip pan 38, a U-shape end member 39, and diagonally extending truss supports 40.

Rails 41 and 42, of the same length as the rails 30 and 31, extend longitudinally of the cart below and in parallel spaced relation to said rails 30 and 31. The rails 41 and 42 are supported within the cart by the brackets 35 and by bracket 43 on the corner posts 27 and on the end member 39 of the aft section 21, and define a relatively narrow gauge track 44. The track 44 is designed to align with rails 45 in a relatively small container, shown in broken lines in Fig. 1.

To permit facile movement of the cart from place to place, wheels and casters are employed. More specifically, a pair of wheels 46 is mounted on an axle 47 that is mounted beneath the end rail 24 of the center section, a caster 48 is mounted on a plate 49 secured to the center of the member 39, and a second caster 50 is mounted on a plate 51 connected to the center section beath the rail 25.

For the purpose of securing the shock mount assemblies in the cart, for preventing shifting of a missile component carrying said assemblies, as shown in Fig. 2, lugs are mounted on the tracks defined by the rails 30, 31 and 41, 42. These lugs each consist of spaced tabs 52 arranged along the rails.

The cart is secured to the container 10 by latch mechanisms now to be described. Since one of these latch mechanisms is carried on the forward end of each of the rails 30, 31, and because they are identical, a description of one will suffice for both of them. By referring to Fig. 1 it will be noted that the rails 30, 31 carry latch plates 53 at their forward ends. One of these latch plates, together with its associated latch mechanism, is better seen in Figs. 3 and 4, and attention is now directed to these views.

The latch plate 53 is welded or otherwise suitably secured to the rail 30 and, as shown in Fig. 4, has an arcuate lower end portion 54 which is formed with spaced openings 55, said lower end portion being of reduced thickness. A latch arm 56 is pivotally mounted on the rear face of the plate 53 by a pivot bolt 57, and is provided at its lower end with a thickened portion 58 which is formed with a groove 59 to receive the reduced arcuate lower end portion 54 of the plate 53. A stop pin 60 limits swinging movement of the latch arm. The latch arm 56 extends beyond the lower end portion 54 of the plate and carries a forwardly projecting aligning pin 61 which is slotted to receive a pivoted locking tongue 62. A plunger latch 63 is carried by the latch arm 56 near its lower end. The plunger latch includes a housing 64, a plunger element 65 having a knob 66, for manual engagement, and a flange 67, and a spring 68 in the housing and confined between the flange 67 and the outer end wall of said housing. The inner end of the plunger element 65 is selectively engageable in the openings 55.

The operation of the invention will now be briefly described. The relatively wide gauge track defined by the rails 30, 31 is designed to receive a missile booster component, when it is desired to remove such a component from the relatively large container 10. A missile sustainer or "Tripak" is carried in a relatively small container, such as is shown in broken lines in Fig. 1 within the container 10. When it is desired to utilize the cart to handle a sustainer or "Tripak," the relatively narrow gauge track 44 is used. As previously stated, the missile component (either booster or sustainer or "Tripak") is fitted with shock mounts comprising bands 69 surrounding the component, and rollers 70 mounted at diametrically opposite points on said bands, which said rollers roll on the rails constituting the tracks, as shown in Fig. 2. That is, the shock mounts constitute adapters for mounting the missile components in their containers in positions for ready removal from said containers along the rails therein.

The cart is moved into position confronting the open end of a container, say the container 10, and the rails 30, 31 are aligned with the rails 15 and 16 in said container. To retain the cart in aligned position the aligning pins 61 are moved through aligned openings 12 in the flange 11, when the locking tongues 62 will fall into place behind said flange. The cart and container will thus be effectively secured to each other in cooperative relation. The component in the container may then be rolled out onto the cart. Bolts passed through the lugs 52 and aligned plates 71 on the shock mounts may be used for securing the component against movement on the cart. The cart may then be separated from the container by disengaging the tongues 62 from behind the flange 11 (manually) and removing the aligning pins. The cart may be wheeled about in the missile assembly area as desired, the wheels 46 and the casters 48 and 50 facilitating such movement. More specifically, the cart is designed to be balanced about the axle 47 within plus or minus 3 foot pounds in all conditions, i.e., loaded or unloaded, so that one man may roll it on a level floor with a booster, a sustainer or a "Tripak" thereon.

The latch mechanisms previously described provide a simple means for securing the cart to either a relatively large container, such as the container 10, or a relatively small one, such as is shown in broken lines within said container 10, the latch arms 56 being movable for positioning the aligning pins to pass through openings in either the relatively large or the relatively small container flanges.

Obviously many modifications are possible in the light of the above teachings. It is therefore to be understood that within the scope of the appended claims the invention may be practiced otherwise than as specifically described.

What is claimed is:

1. A missile component handling cart including, in combination with a missile component shipping container having a pair of spaced, longitudinally extending rails defining a track, and a missile component having shock mounts thereon, the shock mounts having rollers movable along the track, a frame, an axle on the frame, wheels on the axle for supporting the frame above a surface, casters on the frame and spaced longitudinally from the axle and wheels, said frame being tiltable about the axis of the axle for contacting one or the other of the casters with the surface, spaced rails on the frame and defining a track for alignment with the first-mentioned track, a plate secured to the terminal end of one of each of the spaced rails on the frame and in engagement with said container, an arm pivotally mounted on the plates and movable to a selected position, a pin on the arms in engagement with the container when the arms are in said selected position for aligning the rails on the frame with the rails on the container, latch means on the pins in engagement with the container for releasably locking the container to the cart and maintaining the rails on the frame in alignment with the rails on the container, means including arcuate guide portions on the arms and cooperating with complementary arcuate guide means on the plates for guiding the arms to said selected position, and means including a spring urged plunger carried by the arms and movable into engagement with the plates for locking and maintaining the arms in said selected position.

2. A missile component handling cart including, in combination with a missile component shipping container having a flange provided with spaced openings, and a track extending longitudinally within the container, a frame having rails defining a track, a plate secured to said rails of the frame in engagement with the flange on the container, an arm pivotally mounted on the plates and movable to a selected position, a pin on the arms and disposed in one of said spaced openings in the flange, latch means pivotally pinned in engagement with the flange for locking the container to the rails of the frame and maintaining the tracks in alignment, a pair of arcuate guide members on the plates, complementary arcuate guide members on the arms and cooperating with said guide members on the plates for guiding the arms during movement thereof to said selected position, and means including a plunger on the arms and settable at will to different settings for locking and maintaining the arms in a selected setting.

3. A missile component handling cart including a frame having forward, center and aft sections, rails carried by said frame and defining a track, said rails extending above and constituting parts of all of said sections, latch mechanisms carried by the rails and engageable with a container for aligning, locking and maintaining the track with a track in such container said latch mechanism comprising a plate on the rails carried by said frame, an arm pivotally mounted on the plate and settable at will to different settings, an aligning pin carried by said arms for engagement with the container during an aligning operation, a locking member pivotally mounted on the pins in engagement with the container for locking and maintaining said rails in alignment, and means including a spring urged plunger carried by said arms in engagement with the plates for locking said arms in a selected setting, and means for supporting the cart for movement above a surface.

References Cited in the file of this patent

UNITED STATES PATENTS 2,811,240    Fenton    Oct. 29, 1957
2,857,922    Effinger    Oct. 28, 1958

OTHER REFERENCES

Chemical Engineering, vol. 1, No. 1, Jan. 12, 1959, pp. 72, 74.

Missiles and Rockets, vol. 3, No. 1, January 1958, pp. 108, 112, 113.

Missiles and Rockets, vol. 4, No. 20, Nov. 17, 1958, pp. 29, 30.